(12) United States Patent
Loukianov (10) Patent No.: US 6,249,526 B1
(45) Date of Patent: Jun. 19, 2001

(54) VERSATILE TIME DIVISION MULTIPLE ACCESS SLOT ASSIGNMENT UNIT

(75) Inventor: Dmitrii Loukianov, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/886,091

(22) Filed: Jun. 30, 1997

(51) Int. Cl.[7] .............................. H04B 7/212; H04J 3/00
(52) U.S. Cl. ......................... 370/442; 370/337; 710/128
(58) Field of Search .................................. 370/280, 336, 370/337, 347, 395, 437, 442, 458, 487, 490, 498, 509, 311, 321, 360, 522; 710/130, 128; 340/855.4

(56) References Cited

U.S. PATENT DOCUMENTS

| | | | |
|---|---|---|---|
| 4,328,543 | * 5/1982 | Brickman et al. | 710/130 |
| 4,330,857 | * 5/1982 | Alvarez, III et al. | 370/321 |
| 5,134,615 | * 7/1992 | Freeburg et al. | 370/347 |
| 5,594,738 | 1/1997 | Crisler et al. | 370/347 |
| 5,666,355 | * 9/1997 | Huah et al. | 370/311 |
| 5,701,299 | 12/1997 | Umezu | 370/376 |
| 5,822,308 | * 10/1998 | Weigand et al. | 370/280 |
| 5,889,781 | * 3/1999 | Eftimakis et al. | 370/509 |
| 5,926,476 | * 7/1999 | Ghaibeh | 370/395 |

* cited by examiner

Primary Examiner—Hassan Kizou
Assistant Examiner—John Pezzlo
(74) Attorney, Agent, or Firm—Blaekly, Sokoloff, Taylor & Zafman LLP (57) ABSTRACT

The present invention is a versatile time division multiple access ("TDMA") slot allocation unit. In one embodiment, the versatile TDMA slot allocation unit includes a slot counter configured to provide an address representative of a time slot and a slot descriptor table that contains one or more slot descriptors each of which describes an action that may be performed within the time slot. The slot descriptor table is configured to receive the address and provide the slot descriptor pointed to by the address. In addition, the TDMA slot allocation unit includes a slot descriptor decoder configured to decode the slot descriptor and provide one or more signals.

29 Claims, 4 Drawing Sheets

VERSATILE TIME DIVISION MULTIPLE ACCESS SLOT ASSIGNMENT UNIT

BACKGROUND OF THE INVENTION

1. Field of the Invention

The present invention relates to Time Division Multiple Access ("TDMA") controllers. More particularly, the present invention relates to a TDMA slot allocation unit for providing a versatile slot allocation/deallocation in the TDMA controller.

2. Background Information

Data networks which have significant packet propagation delay (i.e., the delay between the transmission of the data packet by a network node and its reception by another node) compared to a packet duration, require a Time Division Multiple Access ("TDMA") controller that controls the time when the node is allowed to access the common media in the transmit mode. To stay synchronized, the TDMA controllers in the network nodes exchange messages. Accordingly, the TDMA controller functions include signal message reception, message interpretation and processing, and message execution.

The complexity of the modern TDMA protocols require the processor to process system messages and generate, among other things, control signals for the hardware. This results in variable delay if software is used for both message interpretation and control signal generation. Moreover, the behavior of the system using a host processor is much less predictable in a multi-tasking operating system because the host processor may not be able to provide the time critical transmit signals on time. One possible solution is to provide a separate processor dedicated to the TDMA controller. However, this yields in a cost increase which is undesirable.

For example, TDMA techniques are being applied to cable modems and several TDMA standards have been proposed for cable modem systems. These standards include IEEE 802.14, Digital Audio and VIdeo Council ("DAVIC"), and Multi-media Communication Network System ("MCNS"), to name a few. With different possible protocols, it is increasingly difficult to adapt to the different and often changing protocols without making changes to the hardware and to make cable modem products interoperable.

Accordingly, there is a need in the art for a TDMA controller which can perform time-critical tasks without an on-board processor and accommodate the changing specifications in the protocol without modification of the hardware.

SUMMARY OF THE INVENTION

The present invention is a versatile time division multiple access ("TDMA") slot allocation unit. In one embodiment, the versatile TDMA slot allocation unit includes a slot counter configured to provide an address representative of a time slot and a slot descriptor table that contains one or more slot descriptors each of which describes an action that may be performed within the time slot. The slot descriptor table is configured to receive the address and provide the slot descriptor pointed to by the address. In addition, the TDMA slot allocation unit includes a slot descriptor decoder configured to decode the slot descriptor and provide one or more signals.

BRIEF DESCRIPTION OF THE DRAWINGS

The features and advantages of the present invention will become apparent from the following detailed description of the present invention in which.

DESCRIPTION OF THE PREFERRED EMBODIMENT

Figure 1:
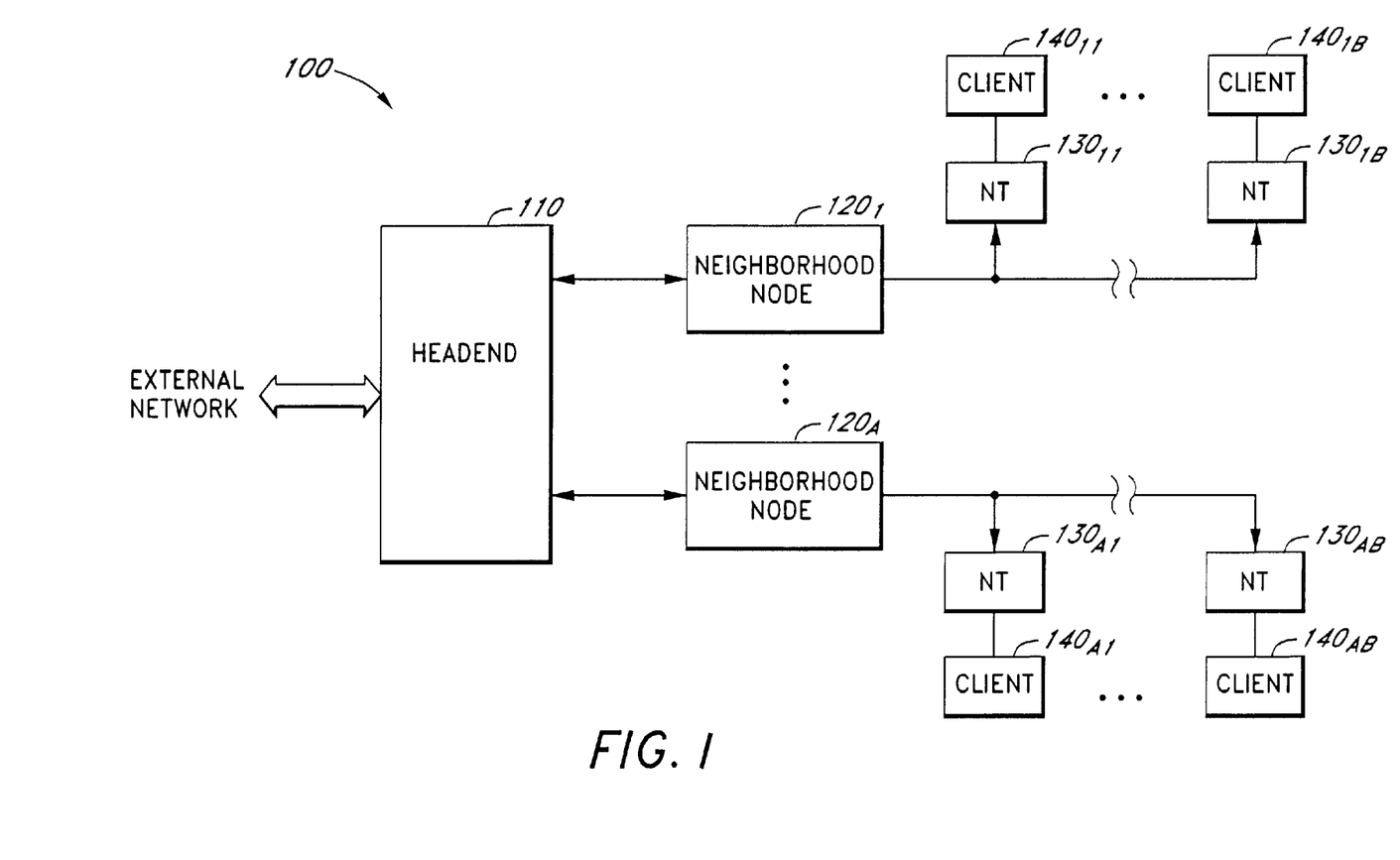
FIG. 1 illustrates an exemplary network system that supports bi-directional communication between a headend and a plurality of clients using Time Division Multiple Access over a medium such as CATV cables.

FIG. 1 illustrates an exemplary network system that supports bi-directional communication between a headend and a plurality of clients using Time Division Multiple Access ("TDMA") over a medium such as Community Antenna TeleVision ("CATV") cables. It is contemplated that the present invention may be implemented in any other TDMA system such as cellular phone systems and satellite communication systems. Referring to FIG. 1, the network system includes a headend 110 which receives data streams from an external network (e.g., Internet), reformats the data streams, and modulates them to radio frequency ("RF"). The resulting channel is fed into the cable transmission equipment as if it were one of the video programs. The data streams are routed between the headend 110 and a plurality of clients $140_{11}$–$140_{1B}$ and $140_{A1}$–$140_{AB}$ through a plurality of neighborhood nodes $120_1$–$120_A$ and a plurality of network termination ("NT") nodes $130_{11}$–$130_{AB}$.

Information flow from the headend 110 to the plurality of clients $140_{11}$–$140_{AB}$ is hereinafter referred to as a "downstream channel" and information flow from the plurality of clients $140_{11}$–$140_{AB}$ to the headend 110 is hereinafter referred to as "upstream channels". The plurality of clients share the upstream channels for communication and access based on a Time Division Multiple Access ("TDMA") method. That is, TDMA allows a plurality of clients to access a shared transmission medium where time is divided into slots and each client is allowed to transmit into the medium in a synchronized manner (i.e., by assigning each client one or more specific time slots to transmit).

The transmit medium between the headend 110 and the one or more clients $140_{11}$–$140_{AB}$ may be a single cable (e.g., coaxial, fiber-optics, etc.) for bi-directional communication, although separate cables may be used for the upstream and the downstream. Moreover, the transmit medium may be different for downstream and upstream (e.g., cable for downstream and radio for upstream). All messages transmitted from the headend 110 (i.e., downstream) is either broadcast (i.e., received by all clients), multicast (i.e., received by a selected group of clients), or singlecast (received by only a selected client). The headend 110 is responsible for signing up new clients and authentication. In addition, the headend 110 may maintain a registration database and generate billing for each client.

Each client is given a unique address or a set of addresses during the sign-on procedure by the headend. This unique address is hereinafter referred to as a Virtual Circuit Identifier ("VCI") and is assigned to a logical connection between the headend and the client. One or more VCIs are reserved for transmitting broadcast messages to all clients. Moreover, a client may be running more than one application process which may require multiple VCIs for a single client. For example, a client may be running an Internet session and video on demand services. In one embodiment of FIG. 1, downstream broadcast messages are transmitted using VCI=0021 and downstream singlecast messages, which are directed to a specific client, are transmitted using VCI=MM21, where MM is the unique client address assigned during the sign-on procedure.

The headend 110 controls when each client may access the medium. On the upstream, slots are numbered from 0 to Z (called a "superframe") where Z is set by the headend 110 (e.g., 64K). Once a superframe ends (i.e., slot Z is reached), another superframe starts with slot number zero. The headend 110 reserves and references slots by its number in advance. Upstream slots are assigned either to a unique client for contentionless transmission, to multiple clients simultaneously for contention based transmission, or for other purposes. The information on the assignment of slots is transmitted in the downstream channel. The headend 110 issues upstream grants for particular VCIs (e.g., a client address assigned during sign-on), superframe number, starting slot number, and the number of consecutive slots allowed. In one embodiment, the upstream grants are formatted into downstream messages transmitted by the headend 110. A protocol may grant a client any number of slots (consecutive or not) greater than zero and less than the superframe size Z.

The headend 110 and each of the clients $140_{11}$–$140_{AB}$ communicate in the system 100 to perform TDMA related functions by use of media access control ("MAC") messages (i.e., the headend and each client communicate on the MAC layer). The MAC messages are transmitted in both directions. The MAC messages carry slot allocation information for the upstream channel. They are constructed as a collection of records defining the initial position of the allocated slot group, the length of the slot group, and their type. The type may be a regular slot allocation which expires at the end of the time slot, or a sticky allocation, which is valid for all subsequent superframe slots with the same slot number. The number of records in the message is variable, and the structure of the messages is different in different specifications.

Figure 2:
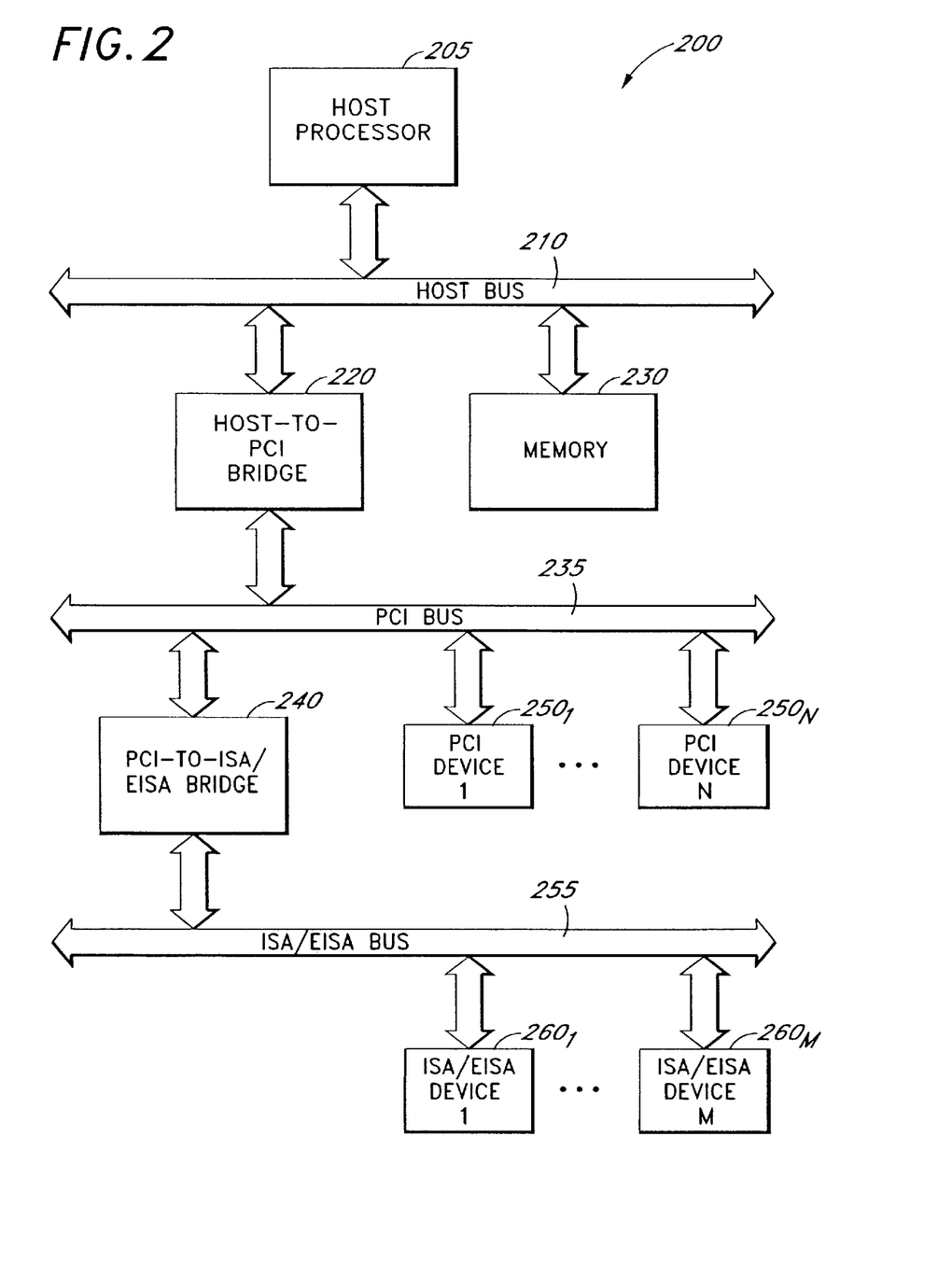
FIG. 2 illustrates an exemplary embodiment of a client computer system suitable for use with the present invention.

FIG. 2 illustrates an exemplary embodiment of a client computer system suitable for use with the present invention. The client computer system 200 includes a processor 250 and a main memory element 230 (e.g., dynamic random access memory "DRAM", static random access memory "SRAM", etc.) coupled together by a host bus 210. A bridge 220 operates as an interface between the host bus 210 and a peripheral bus 235.

Processor 250 may be any type of processor such as a general purpose microprocessor or a microcontroller. In a PC-based client, the CPU is the processor under consideration. Bridge 220 typically includes a cache DRAM controller ("CDC"), a Peripheral Component Interconnect ("PCI") bus controller, and a data path unit ("DPU").

The peripheral bus 235 provides a communication path between the processor 250 or main memory element 230 and a plurality of peripheral devices $250_1$–$250_N$ ("N" being a positive whole number). In particular, the peripheral devices may include a cable modem unit suitable for use with the present invention. The peripheral devices may further include a secondary storage controller (e.g., a hard disk controller) and a video controller. The peripheral bus 235 may include a PCI bus or any other type of bus architecture.

The expansion bus 255 provides a communication path between the peripheral bus 235 and a plurality of expansion peripheral devices $260_1$–$260_M$ ("M" being a positive whole number). A expansion bus bridge 240 operates as an interface between the peripheral bus 235 and the expansion bus 255. The expansion bus 255 may include an Industry Standard Architecture ("ISA") bus or an Extended Industry Standard Architecture ("EISA") bus. However, it is apparent to one skilled in the art that the architecture of the computer system 200 of FIG. 2 is not critical in practicing the present invention.

Figure 3:
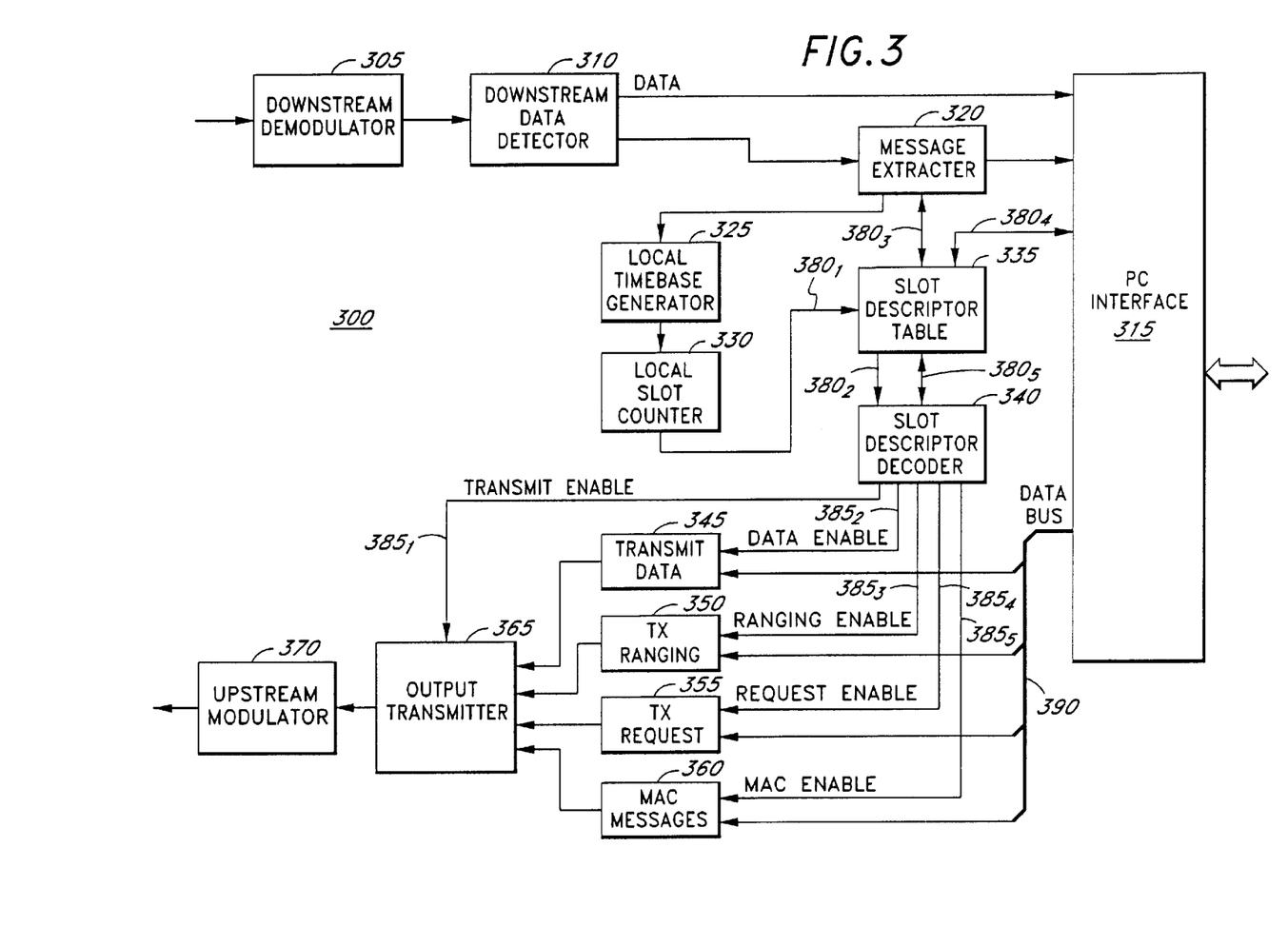
FIG. 3 illustrates an exemplary embodiment of a cable modem unit suitable for use with the present invention.

FIG. 3 illustrates an exemplary embodiment of a cable modem unit 300 suitable for use with the present invention. In one embodiment, the cable modem unit 300 is implemented in a PCI form-factor such as one of the peripheral devices $250_1$–$250_N$ of FIG. 2. At the headend, a downstream RF signal, which includes data, timing, and control information, is transmitted to one or more clients. Referring to FIG. 3, the downstream RF signal is first converted to an intermediate frequency ("IF") and fed into a downstream demodulator 305 (e.g., Quadrature Amplitude Modulation, "QAM"). The downstream demodulator 305 demodulates the downstream RF signal, converts it into digital form, and extracts a data stream. In one embodiment, the data stream comprises of motion picture experts group ("MPEG") frames, although any other type of data stream may be used in lieu thereof. For sake of clarity, the data stream will be hereinafter referred to as MPEG frames. The MPEG frames are transmitted to a downstream data detector 310 over a parallel interface. Typically, each MPEG transport frame includes a program ID ("PID") field which specifies the program carried by the frame. The MPEG data frames may have a specific PID which distinguish them from the MPEG video and audio frames in the aggregate transport stream. In a DAVIC-compatible embodiment, a valid Asynchronous Transfer Mode ("ATM") frame includes seven ATM cells packed into two consecutive MPEG frames.

The downstream data detector 310 analyzes the PID field of the MPEG frame to determine whether it belongs to the cable modem data stream. If it belongs to the cable modem data stream, then the ATM cells are de-wrapped, otherwise the MPEG frame is ignored. Each ATM cell is 53-bytes long and contains a 5-byte header followed by a 48-byte payload. The ATM cell headers are searched and the VCI in the header is compared against the client's VCI (which is assigned during sign-on and stored in a local register (not shown)). If the VCI is a broadcast VCI or it is the VCI for this client, then the ATM cell contains a MAC message or a data payload and should be processed accordingly, otherwise it is ignored. If the VCI does not fall into the MAC space (i.e., the ATM cell's VCI is not the VCI used for MAC messaging), then the ATM cell is forwarded to a PC interface 315. In one embodiment, the PC interface 315 is a segmentation and reassembly ("SAR") controller. However, in other embodiments, the PC interface 315 may be a network controller or a Synchronous Optical Network ("SONET") interface for high speed data, to name a few. The SAR controller 315 reassembles the ATM cells into the original payload format and transmits the data to the CPU or main memory by way of a parallel interface 375 (i.e., a PCI interface).

On the other hand, if the ATM cell falls into the MAC space, the ATM cell is forwarded to a message extractor 320 for further processing. The first byte of the payload specifies the MAC message type. By way of example, the MAC message types include, but are not limited to, sign-on request and response messages, ranging messages, slot reservation request and response messages, etc. The MAC messages may differ for different protocols. Most of the MAC messages are transmitted to the CPU or memory by way of the SAR controller 315 to be interpreted and processed by a software driver running on the client computer system 200 of FIG. 2. However, certain MAC messages are not forwarded to the SAR and are processed in hardware because they are time critical. These MAC messages include, but are not limited to, slot reservation grant, ranging, and synchronization messages.

The synchronization message is used to adjust the local timebase, which is used to derive the TDMA start-of-slot and symbol clock. This broadcast message synchronizes all clients with the master timebase generator, typically located at the headend. The headend periodically (e.g., every 3 milliseconds) sends MPEG frames which contain the MAC synchronization message in the ATM cell of the frame. In DAVIC-compatible systems, the payload of this cell contains the delay between the end of the current MPEG frame and the nominal position of the next upstream slot marker, expressed in downstream symbol clocks. The headend inserts the delay value into the cell in order to accurately deliver the desired local clock phase to each client. The same ATM cell further contains the slot number for the upstream's TDMA slot, which immediately follows the marker. Thus, the headend generates slot marks which accurately specify the time slot boundaries and distributes the timing information to all clients in the system or network.

When the MAC synchronization message is detected by the message extractor 320, the message extractor 320 forwards the MAC synchronization message to a local timebase generator 325. The MAC synchronization message synchronizes the local timebase generator 325 to the master timebase generator. The synchronization message includes a field which provides the slot number for the slot that follows the next slot marker. This field is used to synchronize a local slot counter 330 to the value supplied by the headend. Thus, the local timebase generator 325 adjusts the clock for the local slot counter 330. This assures that the slot numbers are synchronized among all clients. The headend also adjusts the slot positions for each client to compensate for the propagation delay in the medium (the amount of adjustment for each client is determined by the ranging procedure). The output of the local slot counter 330 provides a pointer to a slot descriptor table by way of an address bus $380_1$.

The slot descriptor table 335 is typically contained within a memory device. In a preferred embodiment, the memory device is a random access memory ("RAM"). However, the slot descriptor table 330 may be contained within other memory devices such as, but not limited to, a read only memory ("ROM"), a flash memory, a non-volatile read only memory ("NVRAM"), a register file, and the like.

In one embodiment, the memory device which contains the slot descriptor table 330 is a multi-port memory device. The multi-port memory device may be a true multi-port memory device (e.g., a RAM) having separate address, data, and control signals for each port or may allow multiple devices to access a single port in a time shared manner. In the embodiment of FIG. 3, the memory device has four ports. Multiple data/address/control ports allow several units to simultaneously access the slot descriptor table 330 independently. However, in another embodiment, it is contemplated that the memory device may have a single port for access by a single source. Each address location (i.e., time slot) in the slot descriptor table 330 corresponds to an entry which is a time slot descriptor. The slot descriptors are a set of information for each time slot. The slot descriptors either directly define the actions of one or more controls signals or describe further action which may be performed within each time slot.

The memory device may be accessed randomly by the CPU by way of address/data bus $380_4$. The CPU may read or write slot descriptors, based on the result of the MAC messages received and interpreted. The memory device may also be accessed by the message extractor 320 by way of address/data bus $380_3$ in order to read and write slot descriptors based on the result of the time critical MAC messages received and interpreted (e.g., ranging). The local slot counter 330 provides an address (via address bus $380_1$) to the slot descriptor table 335 which is the slot number. Data bus $380_2$ provides the slot descriptor that corresponds to the slot number specified on the address bus $380_1$ to a slot descriptor decoder 340.

The structure of the slot descriptors and their size may differ from one implementation to another. However, an eight-bit slot descriptor structure is described in Table 1 for illustration purposes only.

TABLE 1

| Bit | Mnemonic | Purpose |
| --- | --- | --- |
| 0 | Sticky | When reset, the slot descriptor is cleared by the end of the slot, which means that the regular slot assignments expire when the slot time ends. When this bit is set, the slot descriptor is not cleared, so the assignment is valid for the same slot number in the next superframe. |
| 1 | Enabled | When set, it indicates that the slot is enabled and transmitter controls should be generated for this time slot. If there is no data to transmit, the idle cell should be sent. |
| 2 | Contention | The contention access is allowed for this time slot. Transmitter controls should be generated only if there is data pending. No idle cells may be transmitted if this bit is set. |
| 3 | Ranging | If set, the pre-defined ranging cell should be transmitted on this time slot. |
| 4 . . . 7 | Y_Next | This is a 4-bit number which allows generation of transmitter controls for Y subsequent time slots if an external condition flag is valid. |

The slot descriptor decoder 340 decodes the slot descriptors and is responsible for the appropriate timing of the transmitter control signals. In one embodiment, the local slot counter 330, the slot descriptor table 335, and the slot descriptor decoder 340 are referred to as a slot allocation unit. The slot descriptor decoder 340 generates a plurality of control signals for controlling transmission of data, MAC messages, ranging data, and other information on the upstream channel. By way of example, the control signals include a transmit enable signal $385_1$ for controlling an output transmitter 365, a data enable signal $385_2$ for controlling a transmit data buffer 345, a ranging enable signal $385_3$ for controlling a ranging buffer 350, a TX request enable signal $385_4$ for controlling a transmit request buffer 355, and a MAC signal $385_5$ for controlling a MAC message buffer 360. In one embodiment, buffers 345, 350, 355, and 360 are first-in first-out ("FIFO") buffers.

Thus, the output of the local slot counter 330 is provided to the slot descriptor table 330 by way of the address bus $380_1$. A slot descriptor corresponding to the address location (the time slot) in the slot descriptor table 330 is retrieved and provided to the slot descriptor decoder 340. The slot descriptor decoder 340 interprets the slot descriptor and performs the function which is assigned, typically by the headend, for this time slot. For example, the function assigned may be to trigger transmission of data cells or any other action to be performed by the client (e.g., provide signals for any operation). When the slot time arrives, the cable modem unit 300, and in particular, the slot allocation unit, must enable data transmission (if there is any data pending) by generating a set of synchronized and precisely sequenced control signals. In one embodiment, the timing precision should be better than 50–100 nanoseconds ("ns"). This is not achievable with low-cost microprocessor support.

Apart from the control signals, the slot descriptor decoder 340 also generates write accesses to the slot descriptor table 330 to modify the slot descriptors by way of address/data bus $380_5$. There is a set of condition flags that determine whether and when the slot descriptor decoder 340 should modify the slot descriptors. These flags may reflect the current superframe configuration. For example, a condition flag may be provided to specify when the slot descriptor decoder 340 should clear the sticky bit after a particular slot has passed. This condition flag may be set by the CPU when instructed to do so in a MAC message by the headend. Other condition flags may come from system functions like the RESET signal. Once a RESET signal is received, the slot descriptor decoder 340 tests and initializes all memory locations of the slot descriptor table 335.

Figure 4:
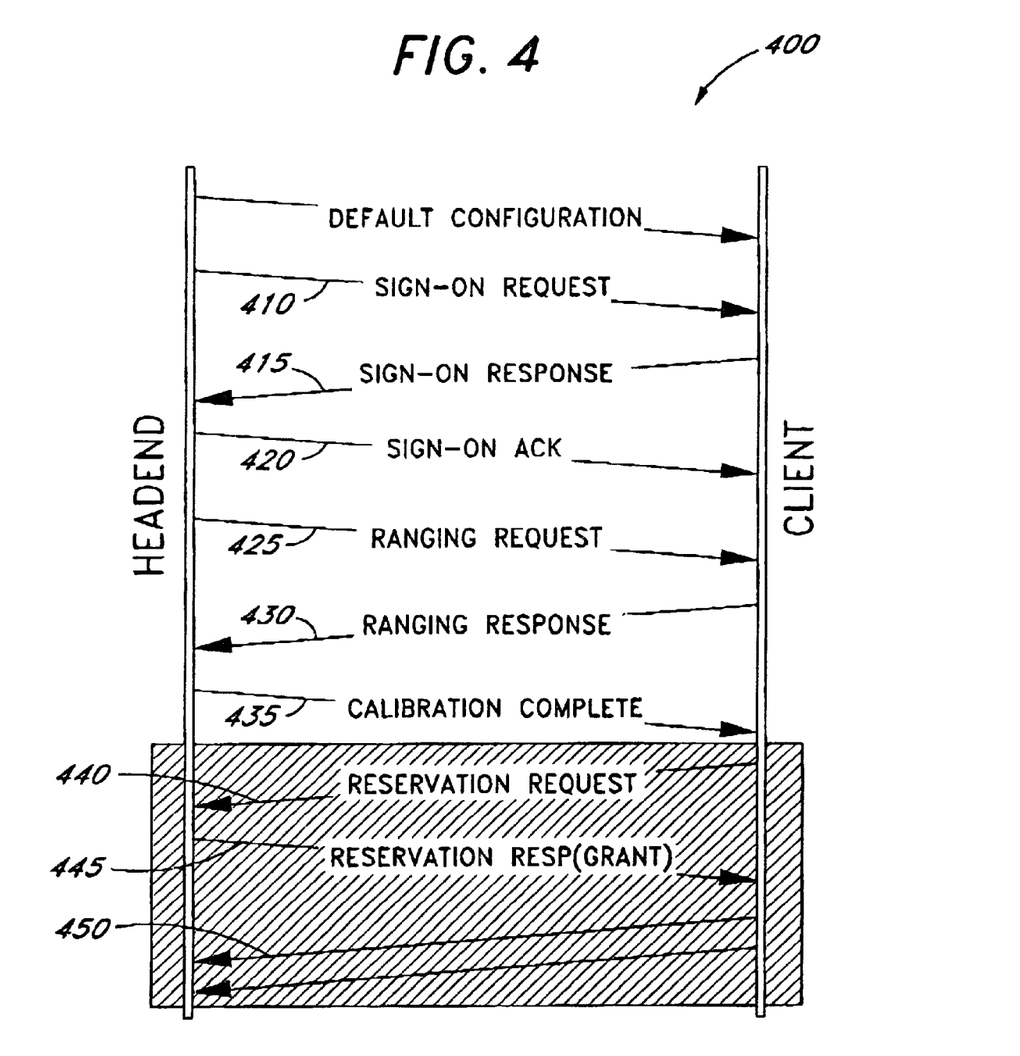
FIG. 4 illustrates an exemplary message exchange between the headend and the cable modem unit.

FIG. 4 illustrates an exemplary message exchange between the headend and the cable modem unit (i.e., client). The message exchange describes sign-on, ranging, and reservation procedures. Referring to FIGS. 3 and 4, the message exchange begins with the headend periodically transmitting a sign-on request message 410 to a plurality of clients. The sign-on request message typically includes the slot number(s) that the sign-on response message can be transmitted on. The sign-on request message is forwarded to the message extractor 320 and to the CPU by way of PC interface 315. The CPU accesses the slot descriptor table 330 to modify the slot descriptor that corresponds to the slot number that the sign-on response message is to be transmitted on. By way of example, the CPU sets the enable and contention bits of the slot descriptor (Table 1). The CPU also transmits the sign-on response message to the transmit request buffer 355 by way of data bus 390. When that slot number arrives, the slot descriptor decoder 340 decodes the slot descriptor and asserts the transmit enable and TX request enable lines $385_1$ and $385_3$, respectively. The sign-on response message 415, which includes a client ID, is applied to an upstream modulator 370. The upstream modulator 370 converts the message to analog form and modulates it for transmission on the upstream channel. The client ID is typically a unique identifier that is assigned by a manufacturer of the client.

Since there are potentially numerous clients that may want to sign-on at the same time, the sign-on response messages are transmitted on contention-based slots. Therefore, a client will wait for a predetermined period of time for a sign-on acknowledgment message 420. If the sign-on acknowledgment message is not received by the client within the predetermined period of time, then a collision is assumed to have occurred and the client must re-transmit the sign-on response message on another contention-based slot. If, however, the headend receives a valid sign-on response message, the headend transmits the sign-on acknowledgment message which includes a unique address (i.e., VCI) assigned to the client. Once the client receives the sign-on acknowledgment message, it prepares for a ranging procedure.

Ranging is required to account for the packet propagation delay between the headend and the clients, each of which may be located at a different distance with respect to the headend. This procedure ensures that a message transmitted on the downstream reaches all clients at the same time. The headend then transmits a ranging request 425 which is received by the client and forwarded to the message extractor 320. Since a ranging response message must be transmitted immediately, the message extractor 320 modifies (sets the enable and ranging bits) the slot descriptor that corresponds to the slot number specified in the ranging request message. The ranging response message is also provided to the TX ranging buffer 350 by way of data bus 390. When the slot number arrives, the pre-recorded ranging response message is transmitted to the headend.

Once the headend receives the ranging response message, it can measure the round-trip delay for the client. Thereafter, the headend transmits a calibration complete message 435 to the client which specifies to the client that it is registered and calibrated with the headend. The client can then request bandwidth for transmitting date on the upstream. The CPU transmits a reservation request to the TX Request buffer 355. In one embodiment, the reservation request includes the VCI of the client and the number of slots requested. Moreover, since many clients may transmit reservation requests, the reservation requests are only transmitted on contention-based slots. To transmit a reservation request, the CPU accesses the slot descriptor table 330 and modifies the slot descriptor corresponding to the slot number allocated for reservation requests. Once the slot time arrives, the reservation request 440 is transmitted on the upstream to the headend. If there was no contention, the headend responds with a reservation grant response 445 which specifies to the client on which one or more slots it can transmit data on, whether the slot is sticky, etc. The client can then transmit data on the slot assigned by the headend by placing data in the transmit data buffer 345 and transmitting the data (arrow 450) when the slot time arrives.

The slot allocation unit of the present invention provides an advantage because it is flexible by accommodating the varying TDMA protocols with sufficient timing precision, without the need for an embedded processor or controller. As a result, the cost of the cable modem unit is reduced and the cable modem unit uses the host CPU to perform protocol message interpretation in software. As such, as the protocol changes or is updated, only a software driver is updated without any hardware modification.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A time division multiple access (TDMA) slot allocation unit in a system having a host processor, comprising:

a slot counter to provide an address representative of a time slot;

a slot descriptor table including a first port and a second port, said slot descriptor table to contain one or more slot descriptors each of which describes an action that may be performed within said time slot, said slot descriptor table to receive said address on an address bus of said first port and to provide said slot descriptor corresponding to said address on a data bus of said first port;

a device to receive messages for processing, said device to forward messages to the host processor, and to access the slot descriptor table via the second port for reading and/or writing slot descriptors responsive to receiving a time-critical message; and a slot descriptor decoder coupled to the data bus of the first port of the slot descriptor table, said slot descriptor decoder to decode said slot descriptor and to provide one or more signals.

2. The TDMA slot allocation unit of claim 1, wherein one of said one or more signals includes a transmit enable signal to control an output transmitter for transmitting a message during a specified time slot.

3. The TDMA slot allocation unit of claim 1, wherein one of said one or more signals include a data signal to control at least one buffer for transmitting one or more messages during one or more time slots.

4. The TDMA slot allocation unit of claim 3, wherein said at least one buffer includes one or more of the following: a transmit data buffer, a ranging buffer, a transmit request buffer, and media access control message buffer.

5. The TDMA slot allocation unit of claim 1, wherein said slot descriptor table includes a third port, said slot descriptor decoder to access the slot descriptor table via the third port to modify one or more slot descriptors.

6. The TDMA slot allocation unit of claim 5, wherein said slot descriptor table includes a fourth port for reading and/or writing by the host processor.

7. The TDMA slot allocation unit of claim 1, wherein said slot descriptor table is contained within one of the following: a random access memory and a register file.

8. The TDMA slot allocation unit of claim 1, wherein said time-critical message comprises one of the following: a slot reservation grant message, a ranging message, and a synchronization message.

9. The TDMA slot allocation unit of claim 1, wherein said slot descriptor table includes a multi-port memory device.

10. A method of providing one or more control signals in a time division multiple access (TDMA) slot allocation unit, the method comprising:

modifying a slot descriptor table in response to receiving one or more specified messages;

forwarding other messages to a host processor for processing and separately accessing the slot descriptor table;

providing an address representative of a time slot from a slot counter to the slot descriptor table for retrieving a slot descriptor, said slot counter is adapted to be synchronized to a master clock;

providing said slot descriptor corresponding to said address from said slot descriptor table to a slot descriptor decoder; and decoding said slot descriptor to generate one or more signals.

11. The method of claim 10 wherein decoding said slot descriptor to generate one or more signals comprises decoding said slot descriptor to generate one or more signals for controlling one or more of the following: an output transmitter, a transmit data buffer, a ranging buffer, a transmit request buffer, and media access control message buffer.

12. The method of claim 10 wherein modifying the slot descriptor table in response to receiving one or more specified messages comprises modifying the slot descriptor table in response to receiving one or more of the following messages: a slot reservation grant message, a ranging message, and a synchronization message.

13. A time division multiple access (TDMA) unit, comprising:

a slot counter to provide an address representative of a time slot and to be synchronized to a master clock;

a multiport memory including a first port having an address bus and a data bus and a second port, said multiport memory to contain a slot descriptor table having one or more slot descriptors each of which describes an action that may be performed within said time slot, said address bus of said first port being coupled to said slot counter to receive said address and to provide a slot descriptor on the data bus;

a message extractor to receive messages, said message extractor for forwarding messages to a host processor, said message extractor to access the slot descriptor table via the second port for reading and/or writing slot descriptors in response to receiving a specified message; and a slot descriptor decoder coupled to said data bus of said first port of said multiport memory, said slot descriptor decoder to decode said slot descriptor and to perform an action in response to said slot descriptor.

14. The TDMA unit of claim 13 wherein said multiport memory includes a third port, said slot descriptor decoder being coupled to said third port of said multiport memory for reading and/or writing slot descriptors.

15. The TDMA unit of claim 13 wherein said action comprises generating one or more signals for controlling one or more of the following: an output transmitter, a transmit data buffer, a ranging buffer, a transmit request buffer, and media access control message buffer.

16. The TDMA unit of claim 13 wherein said multiport memory includes one of the following: a random access memory and a register file.

17. The TDMA unit of claim 13 wherein said specified message comprises one of the following: a slot reservation grant message, a ranging message, and a synchronization message.

18. The TDMA of claim 14 wherein said multiport memory includes a fourth port coupled to a host processor, said host processor to access said multiport memory though said fourth port and to modify one or more slot descriptors in response to receiving one or more messages.

19. The versatile TDMA slot allocation unit of claim 13 wherein said action comprises generating a transmit enable signal to control an output transmitter for transmitting a bit stream during a specified time slot.

20. The versatile TDMA slot allocation unit of claim 13 wherein said action includes controlling one or more devices in response to said slot descriptor.

21. A cable modem unit to communicate with a headend, coprising:

a data detector to receive an information stream from the headend;

a message extractor to receive the information stream from the data detector and to determine whether the information stream is time critical;

a slot counter to receive time synchronization information streams from the message extractor and to provide an address representative of a time a slot;

a slot descriptor table to contain one or more slot descriptors each of which describes an action to be performed within said time slot, said slot descriptor table to receive said address and provide said slot descriptor corresponding to said address; and a slot descriptor decoder to receive and decode said slot descriptor and provide one or more signals in response to said slot descriptor.

22. the cable modem unit of claim 21, wherein said data detector to transmit the information stream to a processor for processing if said information stream includes data.

23. The cable modem unit of claim 21, wherein said message extractor to transmit said information stream to a processor for interpreting said information stream if said information stream is not time critical.

24. The cable modem unit of claim 21, wherein said information stream includes data, timing, or control information.

25. The cable modem unit of claim 21 further including a local timebase generator coupled between said message extractor and said slot counter, said local timebase generator to receive a synchronization message from the headend and to synchronize the slot counter to the headend.

26. The cable modem unit of claim 21, wherein one of said one or more signals includes a transmit enable signal to control an output transmitter for transmitting an upstream information stream.

27. The cable modem unit of claim 21, wherein said slot descriptor table is contained within a memory device.

28. The cable modem unit of claim 27, wherein said memory device includes one or more independent ports, through which one or more devices to access and modify one or more slot descriptors in said slot descriptor table independently from said slot descriptor decoder.

29. the cable modem unit of claim 28, wherein one said one or more devices is a processor to access and modify one or more slot descriptors in said slot descriptor table independently from said slot descriptor decoder in response to said processor receiving an information stream.

* * * * *